(12) United States Patent
Jin

(10) Patent No.: US 10,801,398 B2
(45) Date of Patent: Oct. 13, 2020

(54) TURBOCHARGER

(71) Applicants: Hyundai Motor Company, Seoul (KR); Kia Motors Corporation, Seoul (KR)

(72) Inventor: Seok Beom Jin, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/352,091

(22) Filed: Mar. 13, 2019

(65) Prior Publication Data

US 2020/0158009 A1     May 21, 2020

(30) Foreign Application Priority Data

Nov. 20, 2018   (KR) ........................ 10-2018-0143311

(51) Int. Cl.
    *F02B 37/18*      (2006.01)
    *F02B 37/22*      (2006.01)
    *F02B 37/02*      (2006.01)

(52) U.S. Cl.
    CPC ............ *F02B 37/186* (2013.01); *F02B 37/22* (2013.01); *F02B 37/025* (2013.01); *F05B 2220/40* (2013.01); *F05B 2240/13* (2013.01)

(58) Field of Classification Search
    CPC ...... F02B 37/18; F02B 37/183; F02B 37/186; F02B 37/22; F02B 37/025; F05B 2220/40; F05B 2240/13; F01D 17/141; F01D 17/143; F01D 17/167
See application file for complete search history.

(56) References Cited

U.S. PATENT DOCUMENTS

| 5,855,117 A * | 1/1999 | Sumser ................ F01D 17/143 |
| | | 415/158 |
| 6,715,288 B1 * | 4/2004 | Engels ................ F01D 17/143 |
| | | 415/158 |
| 7,249,930 B2 * | 7/2007 | Lombard ............ F01D 17/105 |
| | | 415/145 |
| 7,428,813 B2 * | 9/2008 | Finger .................. F02B 37/025 |
| | | 137/625.47 |

(Continued)

FOREIGN PATENT DOCUMENTS

| DE | 29917606 U1 * | 5/2000 | .......... F01D 17/146 |
| KR | 20180027697 A | 3/2018 | |

(Continued)

*Primary Examiner* — Jesse S Bogue
(74) *Attorney, Agent, or Firm* — Slater Matsil, LLP

(57) ABSTRACT

A turbocharger includes a turbine housing formed with openings of twin scrolls such that the openings are arranged to be adjacent to each other in an axial direction of a turbine. A fixed sleeve is fixedly disposed within the turbine housing such that an inner surface of the fixed sleeve defines a basic passage as a passage for exhaust gas emerging from the turbine while defining a bypass passage outside the basic passage as a passage for exhaust gas bypassing the turbine. A sliding ring can slide in the axial direction of the turbine between the fixed sleeve and the turbine housing, to control a state in which exhaust gas passing through the twin scrolls is supplied to the turbine and a state in which the exhaust gas passing through the twin scrolls is discharged into the bypass passage while bypassing the turbine.

19 Claims, 6 Drawing Sheets

(56) References Cited

U.S. PATENT DOCUMENTS

| | | | |
|---|---|---|---|
| 7,540,150 B2* | 6/2009 | Schmid | F02B 37/18 |
| | | | 123/562 |
| 8,621,863 B2* | 1/2014 | Kratschrner | F02C 6/12 |
| | | | 60/602 |
| 9,291,092 B2* | 3/2016 | Sumser | F01D 17/105 |
| 9,447,723 B2* | 9/2016 | Hirth | F02B 37/22 |
| 9,624,823 B2* | 4/2017 | Kindl | F01N 13/107 |
| 2010/0024419 A1* | 2/2010 | Pierpont | F02D 41/0065 |
| | | | 60/624 |
| 2012/0031092 A1* | 2/2012 | Sumser | F02B 37/013 |
| | | | 60/602 |
| 2013/0129497 A1* | 5/2013 | Keller | F01D 17/143 |
| | | | 415/208.1 |
| 2014/0223904 A1* | 8/2014 | Wood | F02B 37/013 |
| | | | 60/612 |
| 2014/0331667 A1* | 11/2014 | Kindl | F02M 26/43 |
| | | | 60/602 |

FOREIGN PATENT DOCUMENTS

| | | | | |
|---|---|---|---|---|
| KR | 20190047254 A * | 5/2019 | | |
| WO | WO-2007058647 A1 * | 5/2007 | | F01D 17/143 |
| WO | WO-2008157109 A2 * | 12/2008 | | F02B 37/22 |

* cited by examiner

TURBOCHARGER

CROSS-REFERENCE TO RELATED APPLICATIONS

This application claims priority to Korean Patent Application No. 10-2018-0143311, filed in the Korean Intellectual Property Office on Nov. 20, 2018, which application is hereby incorporated herein by reference.

TECHNICAL FIELD

The present invention relates to a technology concerned with structure of a turbocharger for compressing intake air for an engine using energy attained from exhaust gas from the engine.

BACKGROUND

In an engine having a plurality of cylinders, it is desirable for exhaust gas supplied to a turbocharger to be fed to a turbine of the turbocharger after being branched into two exhaust lines, taking into consideration the sequence of combustion generated in the cylinders, in order to avoid exhaust interference among the cylinders.

For a method for securing exhaust gas needed for exhaust gas recirculation (EGR) in such an engine, a configuration for taking EGR gas out of each of the two branched exhaust lines may be employed. However, this configuration has drawbacks in that the overall system becomes complex, and an increased number of constituent elements is required.

To this end, in order to take out EGR gas only from one of the two exhaust lines provided to supply exhaust gas to the turbine, a configuration including a single EGR line is generally used. In this case, however, when a waste gate valve is opened to discharge exhaust gas from the turbocharger under the condition that the exhaust gas bypasses the turbine, the exhaust line, to which the EGR line is connected, discharges, through the waste gate valve, the same amount of exhaust gas as that of the exhaust line, to which the EGR line is not connected. As a result, it may be difficult to secure a sufficient amount of EGR gas.

The above matters disclosed in this section are merely for enhancement of understanding of the general background of the invention and should not be taken as an acknowledgement or any form of suggestion that the matters form the related art already known to a person skilled in the art.

SUMMARY

Embodiments of the present invention provide a turbocharger capable of stably securing a sufficient amount of EGR gas even in a wasting situation in which exhaust gas is discharged while bypassing a turbine of the turbocharger when an EGR line for taking out EGR gas is connected only to one of two exhaust lines provided to supply exhaust gas from an engine to the turbine.

In accordance with an aspect of the present invention, a turbocharger includes a turbine housing formed with openings of twin scrolls such that the openings are arranged to be adjacent to each other in an axial direction of a turbine. A fixed sleeve is fixedly disposed within the turbine housing such that an inner surface of the fixed sleeve defines a basic passage as a passage for exhaust gas emerging from the turbine while defining a bypass passage outside the basic passage as a passage for exhaust gas bypassing the turbine. A sliding ring can slide in the axial direction of the turbine between the fixed sleeve and the turbine housing, to control a state in which exhaust gas passing through the twin scrolls is supplied to the turbine and a state in which the exhaust gas passing through the twin scrolls is discharged into the bypass passage while bypassing the turbine.

The fixed sleeve may include an inner sleeve defining the basic passage, and an outer sleeve surrounding an outer surface of the inner sleeve such that the bypass passage is defined between the inner sleeve and the outer sleeve. A plurality of sleeve inlets may be formed at a turbine-side end of the outer sleeve, to allow exhaust gas emerging from the sliding ring to be introduced into the bypass passage.

The sliding ring may be provided with a plurality of wasting passages each formed to connect a corresponding one of the sleeve inlets to the openings of the twin scrolls.

One of the twin scrolls may be an exhaust gas recirculation (EGR) scroll, in which the opening thereof is disposed at a position relatively far from the fixed sleeve. An EGR line may be connected to the EGR scroll in order to take out EGR gas from the EGR scroll.

The sliding ring may be configured to slide straight in the axial direction of the turbine between a state in which both openings of the twin scrolls are opened to the turbine such that exhaust gas can be supplied from both the twin scrolls to the turbine and a state in which both openings of the twin scrolls communicate with the sleeve inlets through the wasting passages.

The inlets of the wasting passages may communicate with a portion of the opening of the EGR scroll and an entirety of the opening of the other scroll as a basic scroll, in which the opening thereof is disposed at a position relatively near the fixed sleeve, when the slide ring slides maximally toward the EGR scroll. Each of the wasting passages may have an outlet formed to be disposed relatively near the fixed sleeve, as compared to the corresponding inlet, in order to prevent the outlet from communicating with the corresponding sleeve inlet during at least a period in which an open area of the basic scroll is reduced as the sliding ring slides straight.

The sliding ring may be slidable straight by a linear actuator for generating linear displacement, a link for converting the linear displacement generated by the linear actuator into rotational displacement, and an actuating rod installed between the link and the sliding ring, to receive the rotational displacement of the link and to convert the received rotational displacement into linear displacement of the sliding ring.

In accordance with the present invention, it may be possible to stably secure a sufficient amount of EGR gas even in a wasting situation in which exhaust gas is discharged while bypassing a turbine of the turbocharger when an EGR line for taking out EGR gas is connected only to one of two exhaust lines provided to supply exhaust gas from an engine to the turbine.

In addition, the flow rate of exhaust gas supplied to the turbine may be varied in accordance with operation conditions of the engine, for rapid acceleration of the turbocharger and, as such, the boost response performance of the turbocharger may be improved.

BRIEF DESCRIPTION OF THE DRAWINGS

The above and other features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
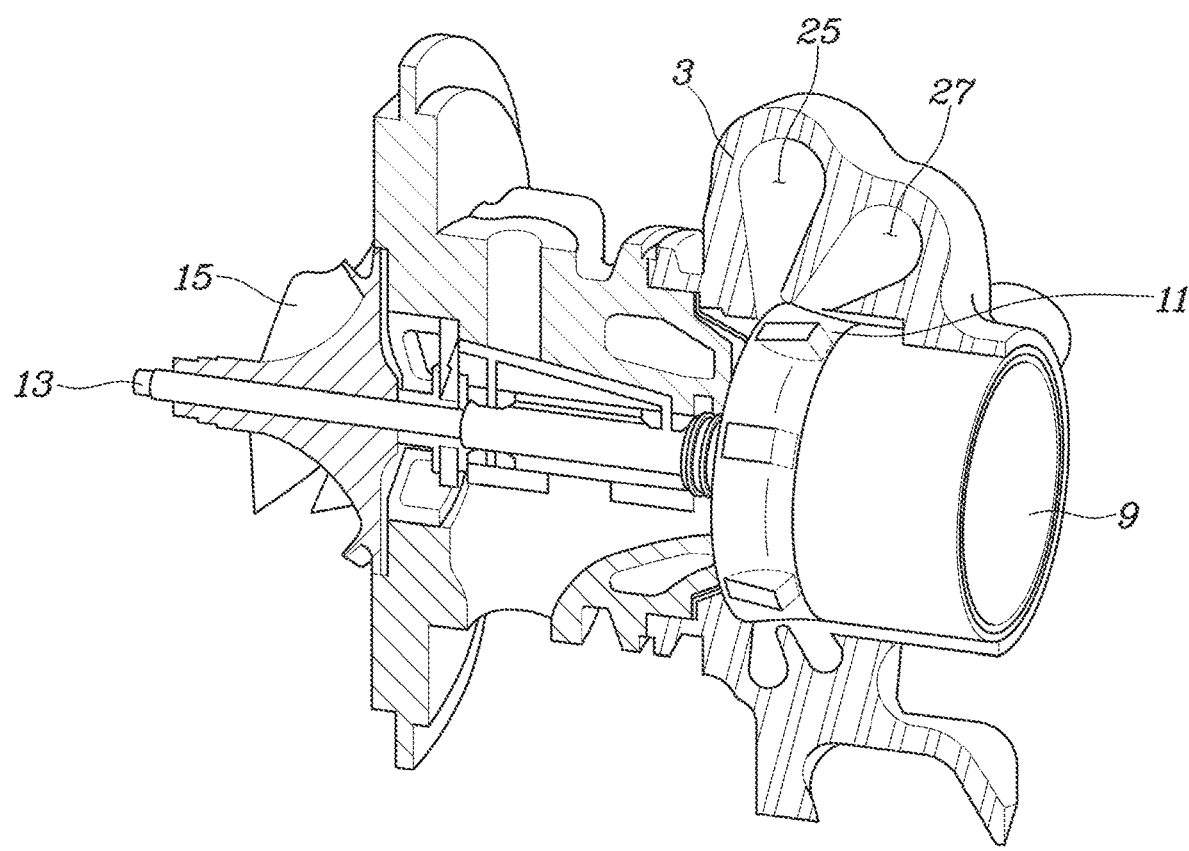
FIG. 1 is a sectional perspective view illustrating a main configuration of a turbocharger according to an embodiment of the present invention.
Figure 2:
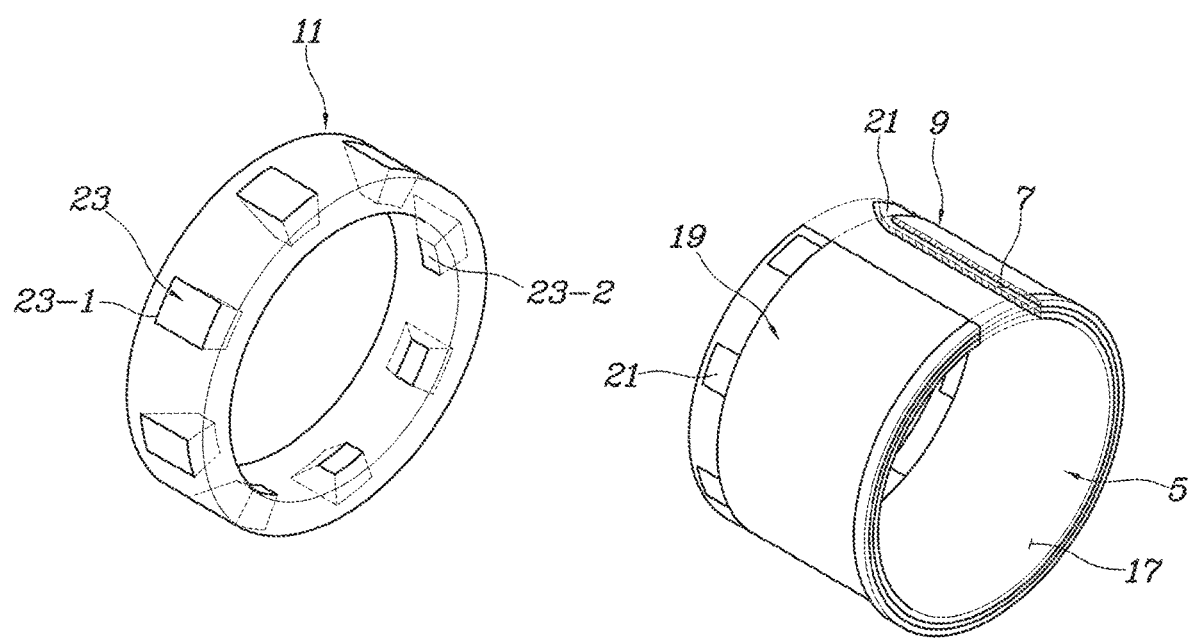
FIG. 2 is a perspective view of a sliding ring and a fixed sleeve, which are shown in FIG. 1.

Reference will now be made in detail to the preferred embodiments of the present invention, examples of which are illustrated in the accompanying drawings. Wherever possible, the same reference numbers will be used throughout the drawings to refer to the same or like parts.

Referring to FIGS. 1 to 6, a turbocharger according to an embodiment of the present invention is illustrated. The turbocharger includes a turbine housing 3 formed with openings of twin scrolls such that the openings are arranged to be adjacent to each other in an axial direction of a turbine 1, and a fixed sleeve 9 fixedly disposed within the turbine housing 3 such that an inner surface of the fixed sleeve 9 defines a basic passage 5 as a passage for exhaust gas emerging from the turbine 1 while defining a bypass passage 7 outside the basic passage 5 as a passage for exhaust gas bypassing the turbine 1. The turbocharger also includes a sliding ring 11 that is slidable in the axial direction of the turbine 1 between the fixed sleeve 9 and the turbine housing 3, to control a state in which exhaust gas passing through the twin scrolls is supplied to the turbine 1 and a state in which the exhaust gas passing through the twin scrolls is discharged into the bypass passage 7 while bypassing the turbine 1.

That is, the present invention can achieve a wasting function to allow exhaust gas supplied to the turbocharger to bypass the turbine 1 without being supplied to the turbine 1 in accordance with a linear sliding state of the sliding ring 11, without provision of a separate waste gate valve.

For reference, in FIG. 1, a compressor 15 connected to the turbine 1 by a shaft 13 is illustrated. The compressor 15 supplies intake air to the engine after compressing the intake air using rotational force transmitted from the turbine 1.

The fixed sleeve 9 includes an inner sleeve 17 defining the basic passage 5, and an outer sleeve 19 surrounding an outer surface of the inner sleeve 17 such that the bypass passage 7 is defined between the inner sleeve 17 and the outer sleeve 19. A plurality of sleeve inlets 21 is formed at a turbine-side end of the outer sleeve 19, to allow exhaust gas emerging from the sliding ring 11 to be introduced into the bypass passage 7.

In addition, the sliding ring 11 is provided with a plurality of wasting passages 23 each formed to connect a corresponding one of the sleeve inlets 21 to the openings of the twin scrolls.

Figure 5:
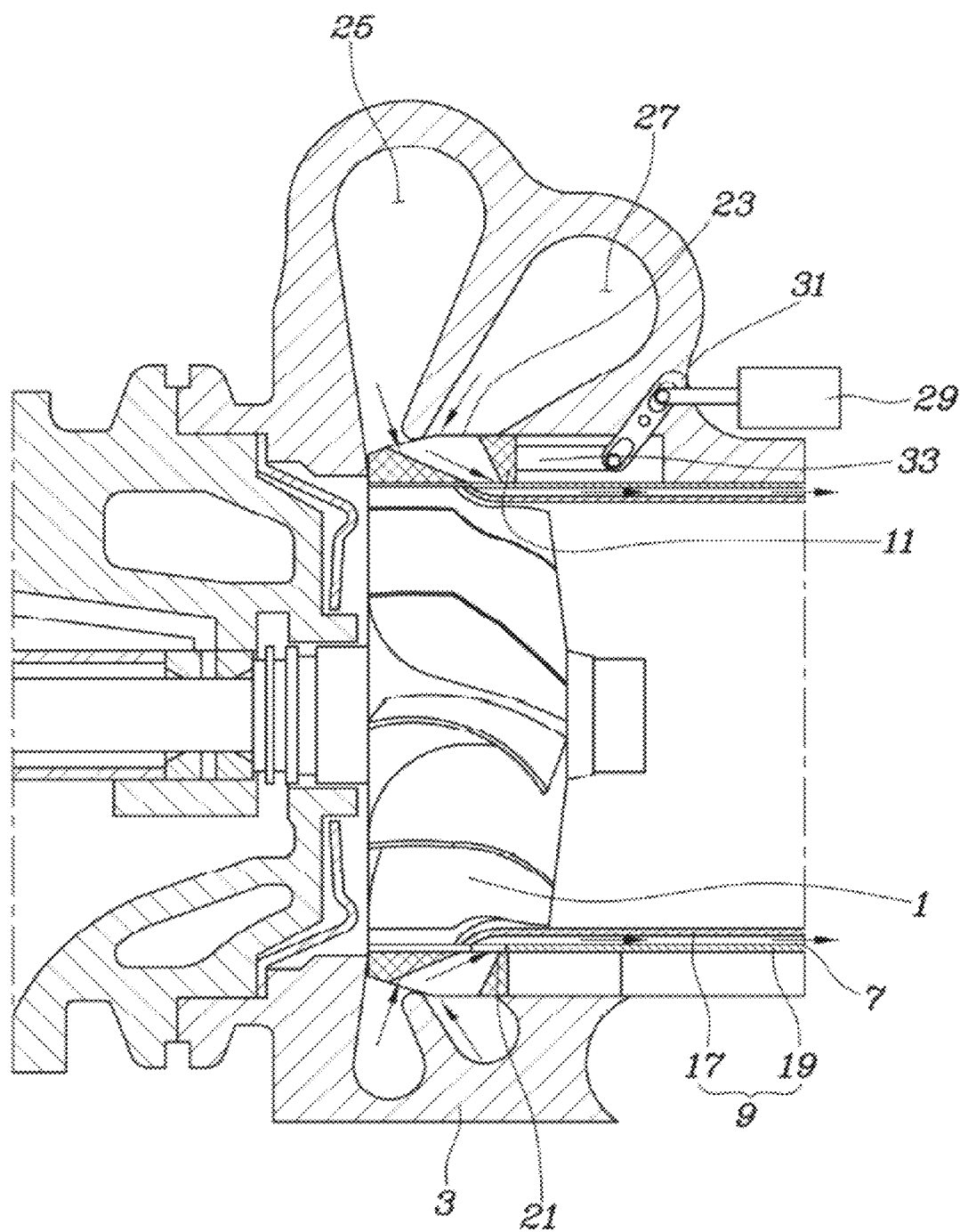
FIG. 5 is a view explaining a wasting state in which the sliding ring connects both openings of basic and exhaust gas recirculation (EGR) scrolls to sleeve inlets in the turbocharger according to the illustrated embodiment of the present invention.

Accordingly, when the sliding ring 11 slides to reach a state of FIG. 5 in which exhaust gas is supplied to the wasting passage 23 of the sliding ring 11, almost all of the exhaust gas supplied to the twin scrolls is wasted while sequentially passing through the wasting passage 23 and the bypass passage 7 and, as such, a state in which exhaust gas bypasses the turbine 1 without being directly supplied to the turbine 1 is achieved.

One of the twin scrolls is an EGR scroll 25 in which the opening thereof is disposed at a position relatively far from the fixed sleeve 9. An EGR line 35 is connected to the EGR scroll 25 in order to take out EGR gas from the EGR scroll 25.

Figure 6:
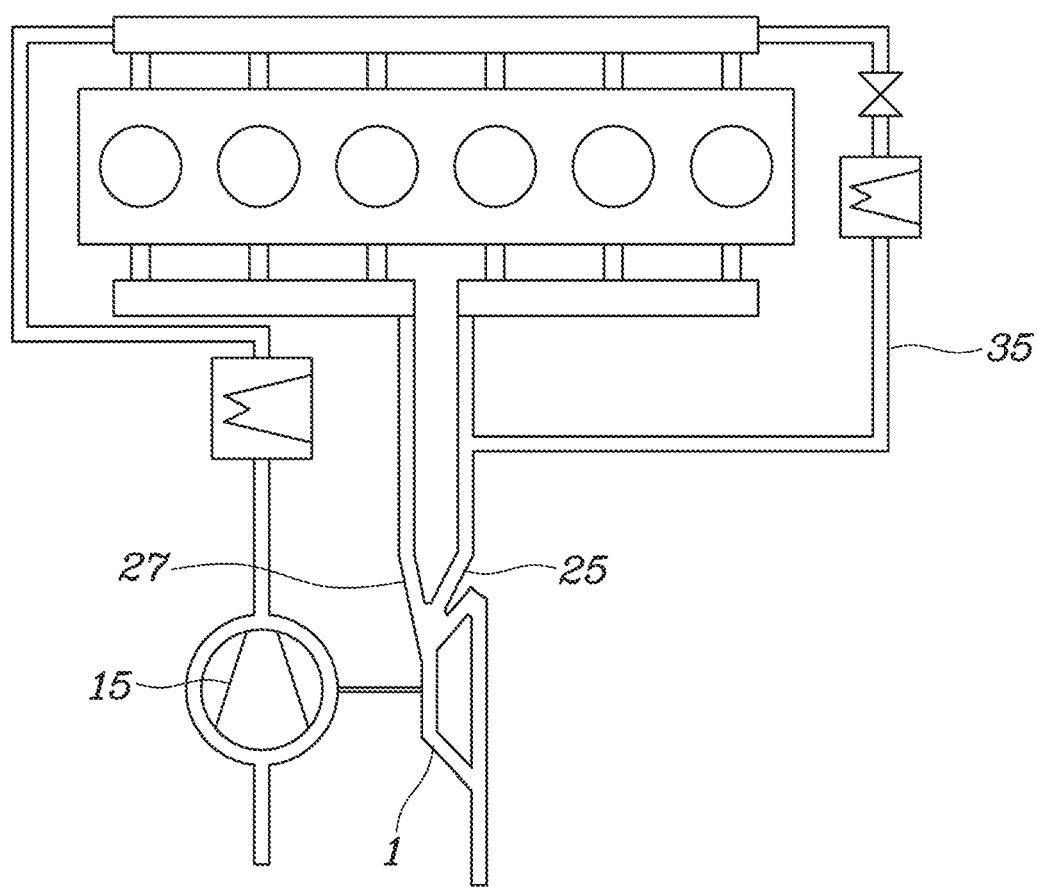
FIG. 6 is a schematic view illustrating the configuration of an engine to which the present invention is applicable.

That is, as illustrated in FIG. 6, the EGR line 35 is connected to an exhaust line extending from an exhaust manifold of the engine to the EGR scroll 25 in order to take out EGR gas needed in the engine from the exhaust line and to supply the taken-out EGR gas to the engine.

Of course, the EGR line 35 is not connected to the other of the twin scrolls, namely, a basic scroll to be described later. That is, the engine has a configuration in which the EGR line 35 is connected only to the EGR scroll 25.

Here, connection of the EGR line 35 to the EGR scroll 25 means that, in practice, the EGR line 35 is connected to the EGR scroll 25 via the exhaust line connected to supply exhaust gas.

The sliding ring 11 is configured to slide straight in the axial direction of the turbine 1 between a state in which both openings of the twin scrolls are opened to the turbine 1 such that exhaust gas can be supplied from both the twin scrolls to the turbine 1 and a state in which both openings of the twin scrolls communicate with the sleeve inlets 21 through the wasting passages 23.

Each wasting passage 23 formed at the sliding ring 11 has an inlet 23-1 formed to communicate with a portion of the opening of the EGR scroll 25 and the overall portion of the opening of the basic scroll 27 positioned relatively near the fixed sleeve 9 when the sliding ring 11 slides maximally toward the EGR scroll 25.

Figure 4:
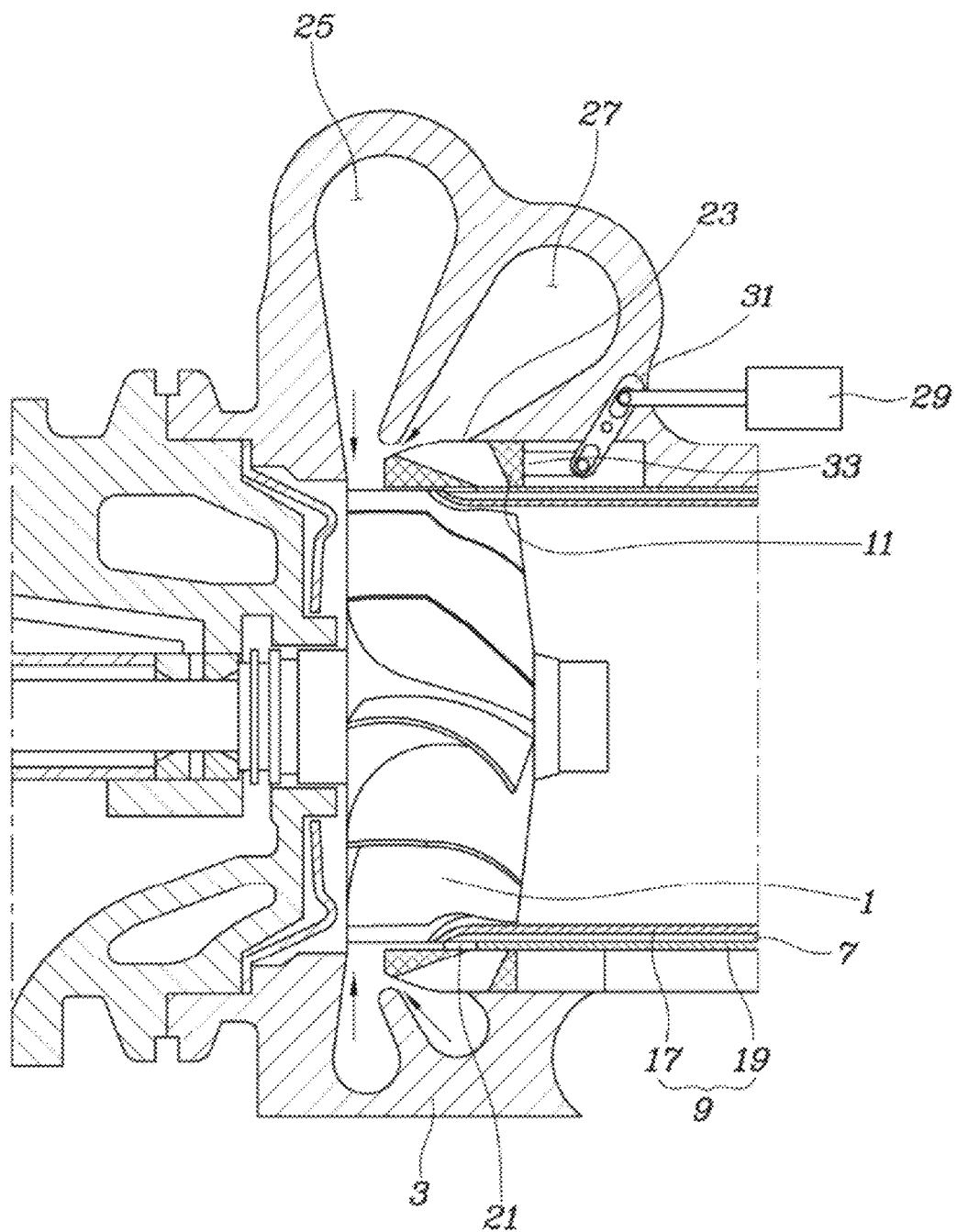
FIG. 4 is a view explaining a situation in which the sliding ring moves while reducing the opening of a basic scroll in the turbocharger according to the illustrated embodiment of the present invention.

Each wasting passage 23 also has an outlet 23-2 formed to be disposed relatively near the fixed sleeve 9, as compared to the inlet 23-1, in order to prevent the outlet 23-2 from communicating with the corresponding sleeve inlet 21, as shown in FIG. 4, during at least a period in which the open area of the basic scroll 27 is reduced as the sliding ring 11 slides straight.

Meanwhile, linear sliding of the sliding ring 11 may be achieved by a linear actuator 29 for generating linear displacement, a link 31 for converting the linear displacement generated by the linear actuator 29 into rotational displacement, and an actuating rod 33 installed between the link 31 and the sliding ring 11, to receive the rotational displacement of the link 31 and to convert the received rotational displacement into linear displacement of the sliding ring 11. Of course, linear sliding of the sliding ring 11 may be achieved by other configurations, for example, a configuration including a rack and a pinion.

Hereinafter, functions of the turbocharger configured as described above in accordance with the present invention will be described through comparison of FIGS. 3 to 5.

Figure 3:
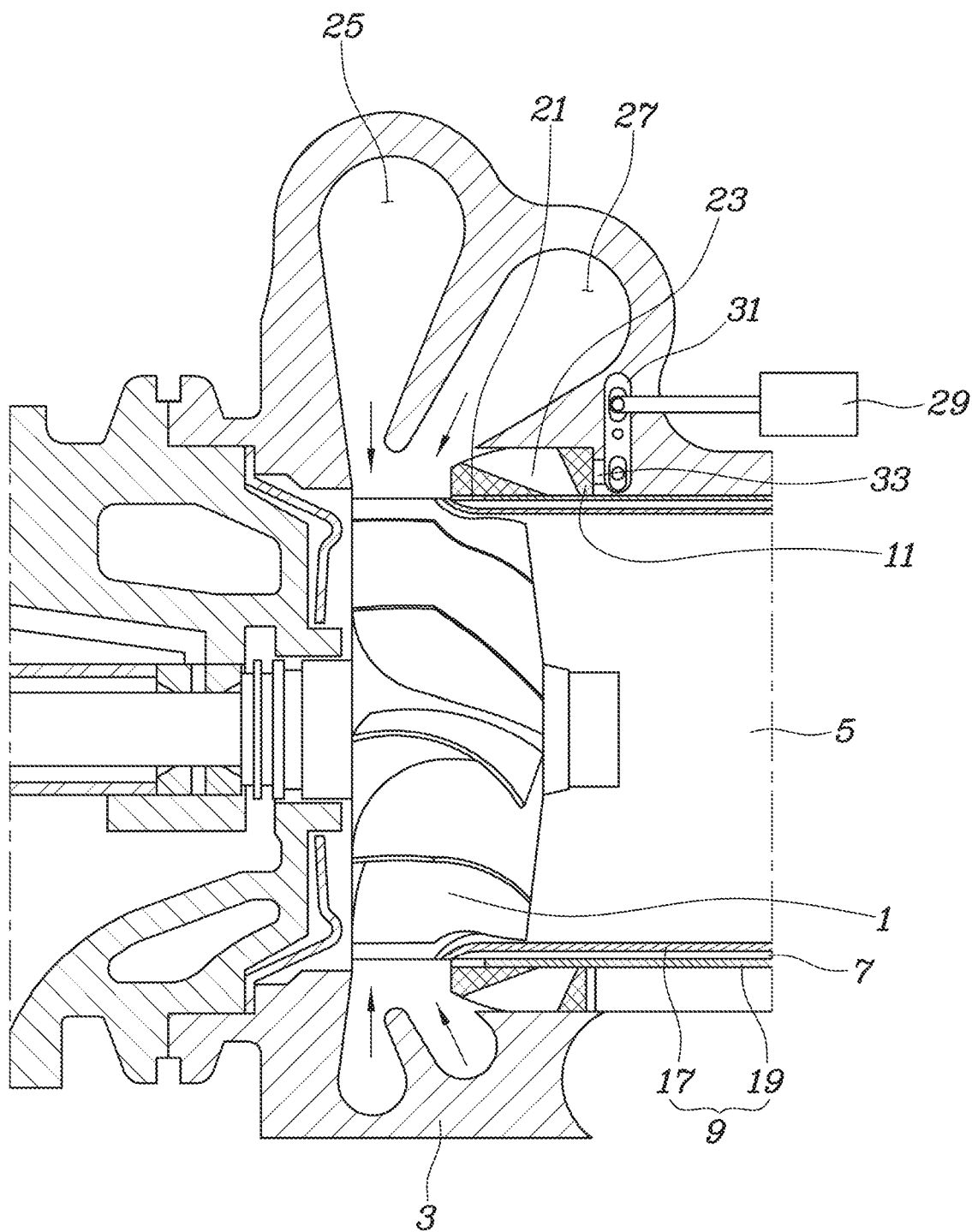
FIG. 3 is a view explaining a state in which the sliding ring opens all openings of twin scrolls in the turbocharger according to the illustrated embodiment of the present invention.

FIG. 3 shows a normal operation state. In this state, the sliding ring 11 has moved sufficiently toward the fixed sleeve 9 and, as such, both the opening of the EGR scroll 25 and the opening of the basic scroll 27 are maintained in a state capable of directly supplying exhaust gas to the turbine 1.

In this state, no exhaust gas flows to the wasting passage 23 and bypass passage 7 of the sliding ring 11.

FIG. 4 shows a state in which the sliding ring 11 slides in accordance with driving of the linear actuator 29 while gradually closing the opening of the basic scroll 27, thereby gradually reducing the flow cross-section area of exhaust gas flowing from the basic scroll 27 toward the turbine 1.

In this state, the flow rate of the exhaust gas supplied to the turbine 1 via the basic scroll 27 can be increased. As a result, rotation of the turbine is rapidly accelerated under a low-load operation condition of the engine and, as such, rapid boost response may be secured.

FIG. 5 shows a state in which the sliding ring 11 has moved maximally toward the EGR scroll 25 in accordance with driving of the linear actuator 29. In this state, the opening of the EGR scroll 25 communicates, only at a portion thereof, with the inlets 23-1 of the wasting passages 23, whereas the opening of the basic scroll 27 communicates, at the entirety thereof, with the inlets 23-1 of the wasting passages 23. Accordingly, exhaust gas from both scrolls is discharged through the wasting passages 23 and the bypass passage 7 of the fixed sleeve 9.

This state is a state in which the wasting function to allow exhaust gas to bypass the turbine is achieved. Even in this state, a sufficient amount of EGR gas can be taken out into the EGR line 35 communicating with the EGR scroll 25.

This is because the opening of the EGR scroll 25 communicates, only at a portion thereof, with the inlets 23-1 of the wasting passages 23 and, as such, the EGR line 35 can secure a sufficient pressure to take out EGR gas.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A turbocharger comprising:
   a turbine housing formed with openings of twin scrolls such that the openings are arranged to be adjacent to each other in an axial direction of a turbine;
   a fixed sleeve fixedly disposed within the turbine housing such that an inner surface of the fixed sleeve defines a basic passage as a passage for exhaust gas emerging from the turbine while defining a bypass passage outside the basic passage as a passage for exhaust gas bypassing the turbine; and
   a sliding ring that is slidable in the axial direction of the turbine between the fixed sleeve and the turbine housing, the sliding ring configured to control a state in which exhaust gas passing through the twin scrolls is supplied to the turbine and a state in which the exhaust gas passing through the twin scrolls is discharged into the bypass passage while bypassing the turbine, wherein one of the twin scrolls is an exhaust gas recirculation (EGR) scroll, in which the opening thereof is disposed at a position farther from the fixed sleeve than the opening of the other one of the twin scrolls, and an EGR line is connected to the EGR scroll in order to take out EGR gas from the EGR scroll.

2. The turbocharger according to claim 1, wherein the fixed sleeve comprises an inner sleeve defining the basic passage and an outer sleeve surrounding an outer surface of the inner sleeve such that the bypass passage is defined between the inner sleeve and the outer sleeve.

3. The turbocharger according to claim 2, wherein a plurality of sleeve inlets are formed at a turbine-side end of the outer sleeve, to allow exhaust gas emerging from the sliding ring to be introduced into the bypass passage.

4. The turbocharger according to claim 3, wherein the sliding ring is provided with a plurality of wasting passages, each wasting passage formed to connect a corresponding one of the plurality of sleeve inlets to the openings of the twin scrolls.

5. The turbocharger according to claim 4, wherein the sliding ring is configured to slide straight in the axial direction of the turbine between a state in which both openings of the twin scrolls are opened to the turbine such that exhaust gas can be supplied from both the twin scrolls to the turbine and a state in which both openings of the twin scrolls communicate with the sleeve inlets through the plurality of wasting passages.

6. The turbocharger according to claim 5, wherein the inlets of the plurality of wasting passages communicate with a portion of the opening of the EGR scroll and an entirety of the opening of the other scroll as a basic scroll, in which the opening thereof is disposed at a position near the fixed sleeve, when the slide ring slides maximally toward the EGR scroll.

7. The turbocharger according to claim 6, wherein each of the plurality of wasting passages has an outlet formed to be disposed near the fixed sleeve, as compared to a corresponding sleeve inlet of the plurality of sleeve inlets, in order to prevent the outlet from communicating with the corresponding sleeve inlet during at least a period in which an open area of the basic scroll is reduced as the sliding ring slides straight.

8. The turbocharger according to claim 1, wherein the sliding ring is slidable straight by:
   a linear actuator for generating linear displacement;
   a link for converting the linear displacement generated by the linear actuator into rotational displacement; and
   an actuating rod installed between the link and the sliding ring, to receive the rotational displacement of the link and to convert the received rotational displacement into linear displacement of the sliding ring.

9. An Internal Combustion engine with a turbocharger comprising:
   a turbine housing formed with openings of twin scrolls such that the openings are arranged to be adjacent to each other in an axial direction of a turbine;
   a fixed sleeve fixedly disposed within the turbine housing such that an inner surface of the fixed sleeve defines a basic passage as a passage for exhaust gas emerging from the turbine while defining a bypass passage outside the basic passage as a passage for exhaust gas bypassing the turbine; and
   a sliding ring that is slidable in the axial direction of the turbine between the fixed sleeve and the turbine housing, the sliding ring configured to control a state in which exhaust gas passing through the twin scrolls is supplied to the turbine and a state in which the exhaust gas passing through the twin scrolls is discharged into the bypass passage while bypassing the turbine;
   wherein the fixed sleeve comprises an inner sleeve defining the basic passage and an outer sleeve surrounding an outer surface of the inner sleeve such that the bypass passage is defined between the inner sleeve and the outer sleeve;

wherein a plurality of sleeve inlets are formed at a turbine-side end of the outer sleeve, to allow exhaust gas emerging from the sliding ring to be introduced into the bypass passage;

wherein the sliding ring is provided with a plurality of wasting passages, each wasting passage formed to connect a corresponding one of the plurality of sleeve inlets to the openings of the twin scrolls; and wherein one of the twin scrolls is an exhaust gas recirculation (EGR) scroll, in which the opening thereof is disposed at a position farther from the fixed sleeve than the opening of the other one of the twin scrolls, and an EGR line is connected to the EGR scroll in order to take out EGR gas from the EGR scroll.

10. The Internal Combustion engine with a turbocharger according to claim 9, wherein the sliding ring is configured to slide straight in the axial direction of the turbine between a state in which both openings of the twin scrolls are opened to the turbine such that exhaust gas can be supplied from both the twin scrolls to the turbine and a state in which both openings of the twin scrolls communicate with the sleeve inlets through the plurality of wasting passages.

11. The Internal Combustion engine with a turbocharger according to claim 10, wherein the inlets of the plurality of wasting passages communicate with a portion of the opening of the EGR scroll and an entirety of the opening of the other scroll as a basic scroll, in which the opening thereof is disposed at a position near the fixed sleeve, when the slide ring slides maximally toward the EGR scroll.

12. The Internal Combustion engine with a turbocharger according to claim 11 wherein each of the plurality of wasting passages has an outlet formed to be disposed near the fixed sleeve, as compared to the corresponding sleeve inlet of the plurality of sleeve inlets, in order to prevent the outlet from communicating with the corresponding sleeve inlet during at least a period in which an open area of the basic scroll is reduced as the sliding ring slides straight.

13. The Internal Combustion engine with a turbocharger according to claim 9, wherein the sliding ring is slidable straight by:
- a linear actuator for generating linear displacement;
- a link for converting the linear displacement generated by the linear actuator into rotational displacement; and
- an actuating rod installed between the link and the sliding ring, to receive the rotational displacement of the link and to convert the received rotational displacement into linear displacement of the sliding ring.

14. A turbocharger comprising:
- a turbine housing formed with openings of twin scrolls such that the openings are arranged to be adjacent to each other in an axial direction of a turbine;
- an inner sleeve fixedly disposed within the turbine housing, the inner sleeve defining a basic passage for exhaust gas emerging from the turbine;
- an outer sleeve surrounding an outer surface of the inner sleeve such that a bypass passage is defined between the inner sleeve and the outer sleeve, the bypass passage for exhaust gas bypassing the turbine;
- a sliding ring that is slidable in the axial direction of the turbine between the inner sleeve and the turbine housing, the sliding ring configured to control a state in which exhaust gas passing through the twin scrolls is supplied to the turbine and a state in which the exhaust gas passing through the twin scrolls is discharged into the bypass passage while bypassing the turbine;
- a linear actuator for generating linear displacement;
- a link for converting the linear displacement generated by the linear actuator into rotational displacement; and
- an actuating rod installed between the link and the sliding ring, to receive the rotational displacement of the link and to convert the received rotational displacement into linear displacement of the sliding ring, wherein one of the twin scrolls is an exhaust gas recirculation (EGR) scroll, in which the opening thereof is disposed at a position farther from the inner sleeve than the opening of the other one of the twin scrolls, and an EGR line is connected to the EGR scroll in order to take out EGR gas from the EGR scroll.

15. The turbocharger according to claim 14, wherein a plurality of sleeve inlets are formed at a turbine-side end of the outer sleeve, to allow exhaust gas emerging from the sliding ring to be introduced into the bypass passage.

16. The turbocharger according to claim 15, wherein the sliding ring is provided with a plurality of wasting passages, each wasting passage formed to connect a corresponding one of the sleeve inlets to the openings of the twin scrolls.

17. The turbocharger according to claim 16, wherein the sliding ring is configured to slide straight in the axial direction of the turbine between a state in which both openings of the twin scrolls are opened to the turbine such that exhaust gas can be supplied from both the twin scrolls to the turbine and a state in which both openings of the twin scrolls communicate with the plurality of sleeve inlets through the plurality of wasting passages.

18. The turbocharger according to claim 17, wherein the inlets of the plurality of wasting passages communicate with a portion of the opening of the EGR scroll and an entirety of the opening of the other scroll as a basic scroll, in which the opening thereof is disposed at a position near the inner and outer sleeves, when the slide ring slides maximally toward the EGR scroll.

19. The turbocharger according to claim 18, wherein each of the plurality of wasting passages has an outlet formed to be disposed near the inner and outer sleeves, as compared to a corresponding sleeve inlet of the plurality of sleeve inlets, in order to prevent the outlet from communicating with the corresponding sleeve inlet during at least a period in which an open area of the basic scroll is reduced as the sliding ring slides straight.

* * * * *